United States Patent [19]
Fields

[11] Patent Number: 5,259,800
[45] Date of Patent: Nov. 9, 1993

[54] MICROPROCESSOR CONTROLLED SYSTEM FOR TESTING AND SELECTIVELY RECONDITIONING A CRT

[75] Inventor: Gary C. Fields, Napa; Mark E. Stamos, Oakland; Lawrence T. Pena, San Carlos; all of California.

[73] Assignee: Conway Engineering, Inc., Oakland, Calif.

[21] Appl. No.: 961,240

[22] Filed: Oct. 15, 1992

[51] Int. Cl.⁵ .................................................. H01J 9/42
[52] U.S. Cl. ........................................... 445/61; 445/2
[58] Field of Search ...................................... 445/2, 61

[56] References Cited

U.S. PATENT DOCUMENTS

| | | | |
|---|---|---|---|
| 2,897,435 | 7/1959 | Fistell | 445/61 X |
| 3,641,391 | 2/1972 | Badewitz | 445/61 |
| 3,915,533 | 10/1975 | Kozicki | 445/61 X |
| 3,977,745 | 8/1976 | DiCecco et al. | 445/61 |
| 3,997,223 | 12/1976 | Feldman | 445/61 X |
| 4,066,311 | 1/1978 | Poulson | 445/61 |

*Primary Examiner*—Kenneth J. Ramsey
*Attorney, Agent, or Firm*—Townsend and Townsend Khourie and Crew

[57] ABSTRACT

A microprocessor controlled system for testing and selectively reconditioning a CRT in accordance with the Beltron process. The microprocessor monitors the function and filament voltage selection switches actuated by an operator. Once the filament voltage and functions have been specified, the microprocessor automatically controls the application of filament voltage, AC voltage and relatively high DC voltage to the CRT and displays the progress and results of the selected function. The system tests the emission characteristics of the cathode in each gun element, causes simultaneous cleaning of the cathode/grid elements by controlling the application of an AC voltage across each cathode/-grid circuit while the filament voltage is at an elevated level, and restores those cathode/grid circuits requiring restoration by controlling the application of a relatively high DC voltage to each cathode/grid circuit in serial fashion for the several gun elements while maintaining the filament voltage at an elevated level. The system substantially reduces required operator interaction with the testing and reconditioning procedure and provides a commensurate reduction in the probability of destruction of a CRT by operator error.

11 Claims, 4 Drawing Sheets

MICROPROCESSOR CONTROLLED SYSTEM FOR TESTING AND SELECTIVELY RECONDITIONING A CRT

BACKGROUND OF THE INVENTION

This invention relates to the field of cathode ray tube (CRT) testing and reconditioning. More particularly, this invention relates to a system for testing both monochrome and color CRTs for acceptable electron emission from the cathode element and for non-invasively reconditioning a weak cathode element, when required.

The cathode ray tube, because of its inherent nature, is one element of a computer system, a television set, or test equipment that is virtually guaranteed to "wear out" with use. The emissive material coating the cathode or cathodes of most CRTs is subject to a "crusting" phenomenon, which is believed due to several factors, such as depletion of the emissive cathode coating or oxidation of the emissive cathode coating from gasses remaining in the tube after manufacture. Regardless of the cause, the net result is a reduction in cathode emissions, which impairs the ability of the CRT to provide sharp images with acceptable contrast and resolution.

Several methods are known which have been devised to extend the useful life of the CRT by reversing the "crusting" phenomenon. One popular approach is known as the Beltron process which is basically described in U.S. Pat. No. 3,641,391 and which provides a workable methodology for the testing, cleaning and restoring of a CRT (when necessary). Prior to the advent of the invention herein, the Beltron process was implemented in a portable carrying case having a hinged lid for protecting the test equipment panel and associated hardware components. In this version, the test equipment includes several analog meters and indicator lamps, manually controllable switches and potentiometers, and three separate connector sockets for connecting a CRT to the test equipment during three different modes of operation: viz., Test, Clean and Restore. The test equipment includes suitable circuitry for generating the necessary AC and DC voltages required to perform the various modes of operation in the following manner.

Initially, the operator connects a CRT to the test socket using a cable connector and adapter socket appropriate for the particular CRT to be tested, and the unit is turned on to apply AC power to the system circuitry. Next, the operator manually adjusts the potentiometer which controls the value of the filament DC voltage, observing the value of the voltage on one of the analog meters. At the same time, the operator observes one or more of the analog current meters to observe the rise time of each cathode/grid circuit. During this portion of the test process, the application of the proper filament voltage to the filament of the CRT causes heating of the cathode element(s) within the tube. As the cathode is heated, the current flowing between the cathode and the grid is measured by the meter connected to the particular cathode/grid circuit. For a tube functioning adequately, the rise time from zero to a preselected threshold value (about 85 milliamps) should not exceed about 15 seconds. For a color CRT with three sets of cathode/grid elements, all three pairs of elements should exhibit approximately the same rise time. This can be observed by the operator by looking at the three separate ammeters individually dedicated to the three gun elements. After noting the rise time, the operator then interrupts the filament DC voltage using an interrupt switch and observes the emission time by looking at the same ammeters and noting the length of time that each pair of cathode/grid elements remains at the threshold current level before beginning to decay. For a good tube, the steady state maximum threshold current should remain for approximately 8 to 10 seconds, and then smoothly drop off to zero milliamp. After this part of the test process, the operator then releases the interrupt switch and again observes the current rise time. During the test process, a filament cathode short is signified by the illumination of a dedicated SHORT lamp. For a CRT which exhibits acceptable rise time and emission time characteristics (as observed by the operator) and which does not exhibit a filament/cathode short, no further procedures are necessary under the Beltron process.

For a CRT which does not test up to the desired standard, the Clean procedure is next performed. Initially, the operator removes the connector from the test socket and installs the connector in the dedicated Clean socket. Next, the operator manually increases the filament voltage by approximately 60% to a value of approximately 10 or 20 volts (depending on whether the CRT has a 6.3 volt or a 12.6 volt filament) and observes the cleaning lamps. During the cleaning process, the test equipment applies an AC voltage across the cathode/grid elements. The elevated filament voltage heats the cathode beyond the normal range and boils off some of the non-emissive material from the cathode. The AC voltage assists in this process and also helps to remove any contaminant materials or particles which might be lodged between the cathode and grid elements. During this process, the operator observes the cleaning lamps. After approximately 30 seconds all lamps should glow brightly. Next, the operator reduces the filament voltage to the normal value and, after a 30 seconds cool down period, removes the connector from the clean socket, reinstalls the connector to the test socket and repeats the test procedure. During the clean procedure, if any cleaning lamps do not glow brightly at the elevated filament voltage, or are extinguished when the filament voltage is reduced to the nominal value, then the Restore procedure is commenced.

To begin the Restore procedure, the connector is installed in the Restore socket. For a color CRT, a three position gun selector switch is manually set to one of the indicated gun positions which has been determined to require the Restore procedure during the Test and Clean procedures. After the setting of the gun selector switch, the operator manually increases the filament voltage by approximately 60%. During the Restore procedure, the elevated filament voltage heats the cathode beyond the normal operating temperature to burn off non-emissive contaminants (as in the Clean procedure). At the same time, a relatively high DC voltage is applied between the cathode and grid elements, which helps attract electron emissive material to the cathode surface. During the Restore procedure, the operator observes the restoring current meter associated with the selected gun element. The meter should show a smooth increase of current to at least about 80 milliamps. At the same time, the operator observes a restoring indicator lamp which should glow in unison with the meter. When the Restore current meter indicates that the cathode grid current has reached the 80 milliamp value, the Restore circuit is interrupted by the operator by depressing an interrupt switch. After a few seconds, the operator then releases the interrupt switch to reapply the Restore current. A successfully restored gun should show a smooth increase on the Restore current meter to at least 80 milliamps with the restoring indicator lamp glowing steadily in unison with the meter. After the Restore procedure has been completed for one gun element, the gun selector switch is manually set to the position of the next gun element requiring the Restore procedure. The procedure is sequentially repeated for those gun elements requiring the Restore procedure. After the Restore procedure has been completed for the last gun element, the CRT is permitted to cool for at least 30 seconds. Thereafter, the Test procedure is repeated for the CRT.

After a successful Restore procedure, the CRT is finally balanced by returning to the Clean procedure. As the operator manually increases filament voltage in a gradual fashion up to the increased 60% level, the cleaning lamps are observed. All three cleaning lamps (one for a monochrome CRT) should glow brightly. After approximately 10 seconds of the elevated filament voltage, the operator reduces the filament voltage to the normal value. The cleaning lamps should continue to glow for several seconds. Thereafter, the filament voltage is reduced to zero and the tube is allowed to cool for at least 30 seconds. The operator then returns to the Test procedure to do a final test on the now-restored CRT.

While the above Beltron process has been successfully used for many years for testing, cleaning and restoring those CRTs capable of being restored, the system used to implement the process has several drawbacks. Firstly, the necessity for manually disconnecting the CRT connector from one socket and connecting this to a different socket is time consuming, which slows down the entire process. In addition, the need to visually observe several different meters while manually adjusting the filament voltage introduces an element of subjectivity into all three procedures (i.e., Test, Clean and Restore) which can lead to varying results and renders the system less useful to those of only minimal technical skill.

SUMMARY OF THE INVENTION

The invention comprises a system for performing the Beltron process which is devoid of the disadvantages noted above, and which provides automatic operation for the Test, Clean and Restore procedures which eliminates potential sources of operator error in performing the Beltron process.

A microprocessor controlled system for testing and selectively reconditioning CRTs having a filament and at least one pair of cathode/grid elements includes power supply means for generating an AC voltage, a relatively high DC voltage, and a relatively low DC voltage. Connector means is provided for coupling voltages from the power supply means to the filament, cathode and grid elements of the CRT. The invention includes means for selectively converting the relatively low DC voltage to a filament DC voltage, and power transfer means for selectively applying the AC voltage, the relatively high DC voltage and the filament DC voltage to the connector means.

Operator selectable information entry means is provided for selecting a filament voltage matched to a CRT to be tested and also for specifying a function to be performed on the CRT. The information entry means preferably comprises a plurality of push button switches each specifying a different function to be performed.

Display means are provided for displaying information related to the filament voltage and a function specified by the entry means, such as the type of function selected, the countdown time for the function being performed, and the operational result (e.g., measured rise time and emission time of the separate cathode/grid elements).

Sensor means coupled to the connector means monitors any current flowing through the cathode/grid elements of the CRT, the sensor means including at least one pair of DC current sensing circuits for indicating the minimum value and the maximum value of current flowing through the cathode/grid elements of the CRT. The sensor means also preferably includes means for determining the absence of a conductive CRT filament.

Processor means coupled to the operator entry means, the converting means, the sensor means, the power transfer means and the display means is provided for selectively controlling the value of the filament voltage, the application of the AC voltage and the relatively high DC voltage to the connector means, and the function to be performed in accordance with the Beltron process.

The converting means preferably comprises a voltage controlled variable voltage regulator having a control input, and a digital-to-analog converter having an output coupled to the control input and an input coupled to the processor means for receiving a digital word specifying the required filament voltage value.

The converting means also preferably includes means for selecting one of two ranges of permitted filament voltage values.

The power transfer means preferably comprises a plurality of controllable relays having power input terminals coupled to the power supply means, power output terminals coupled to the connector means, and control input terminals coupled to the processor means.

The invention further preferably includes current limiting means coupled to the power transfer means for limiting the value of the DC current flowing through the cathode/grid elements of the CRT.

When used in conjunction with a CRT having three pairs of cathode/grid elements, the power transfer means includes means for simultaneously applying the AC voltage to the three pairs of cathode/grid elements during the Clean procedure, and means for consecutively applying the relatively high DC voltage to the three pairs of cathode/grid elements during the Restore procedure.

Since the system provides automatic performance of the Test, Clean and Restore procedures, the element of subjectivity in the three procedures associated with the formerly required manual adjustment of the filament voltage coupled with concurrent observation of several analog meters and lamp indicators is eliminated. In addition, the precise control by the processor of the filament voltage required for each procedure eliminates any deviations from the desired filament voltage and the rate of change to a precise degree. The system also eliminates the need for separate connector sockets for the Test, Clean and Restore procedures so that the entire Beltron process, or the individual procedures, can be carried out at minimum time without the interruption formerly required. The ability to determine selection of the wrong filament voltage or CRT type by the operator also eliminates the possibility of damage to a CRT prior to the beginning of any procedure by applying the wrong filament voltage.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
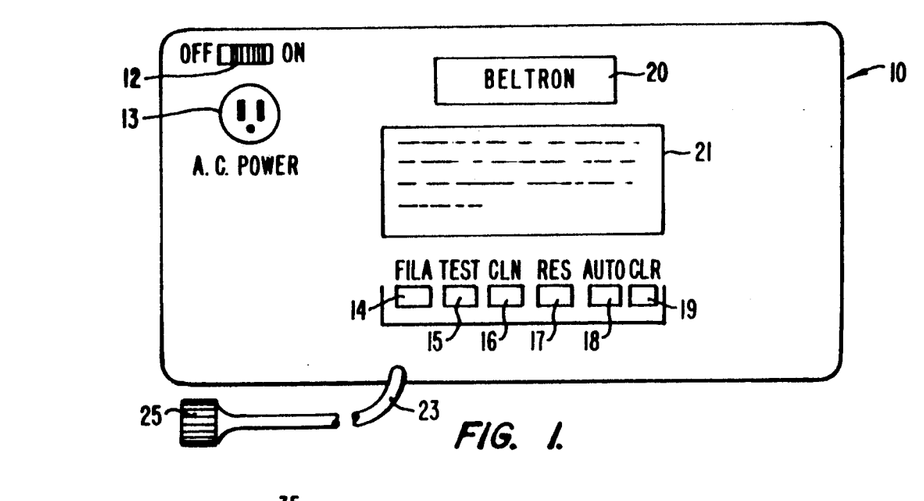
FIG. 1 is a plan view of an instrument panel of the preferred embodiment of the invention.

Turning now to the drawings, FIG. 1 illustrates the operator panel of preferred embodiment of the invention. As seen in this Figure, panel 10 has an on/off power switch 12, an AC power socket 13 a plurality of push button switches 14-19 and a display 20 for displaying information related to the system operation as more fully described below. A central region 21 of panel 10 is provided for the imprinting of basic operator information.

A connector cable 23 extends outwardly from the lower margin of panel 10 and terminates in an adapter 25. Adapter 25 is designed for use with a plurality of matching connectors (not shown) designed for use with specific types of CRTs to be tested and selectively reconditioned by the system. A main information booklet (also not shown) is provided with the system, the booklet including information relating various CRT types to a specific connector furnished with the system. The booklet also specifies the filament voltage for which each CRT type is designed.

Figure 2:
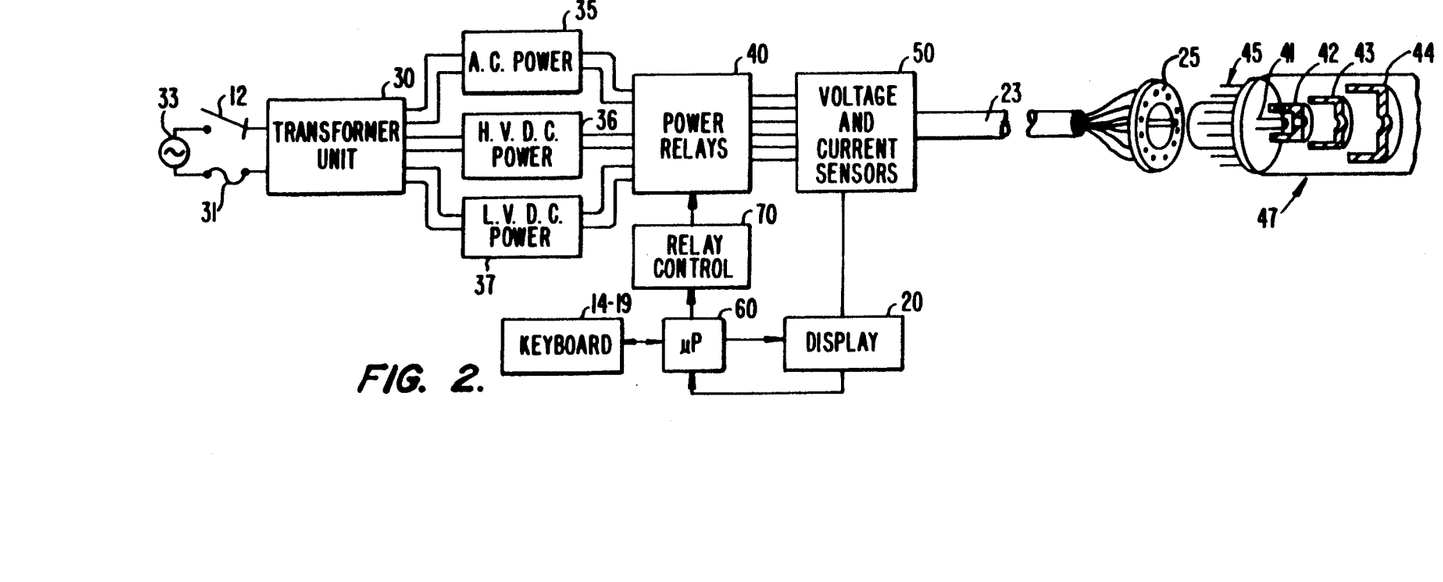
FIG. 2 is a system block diagram of the preferred embodiment of the invention.
Figure 3:
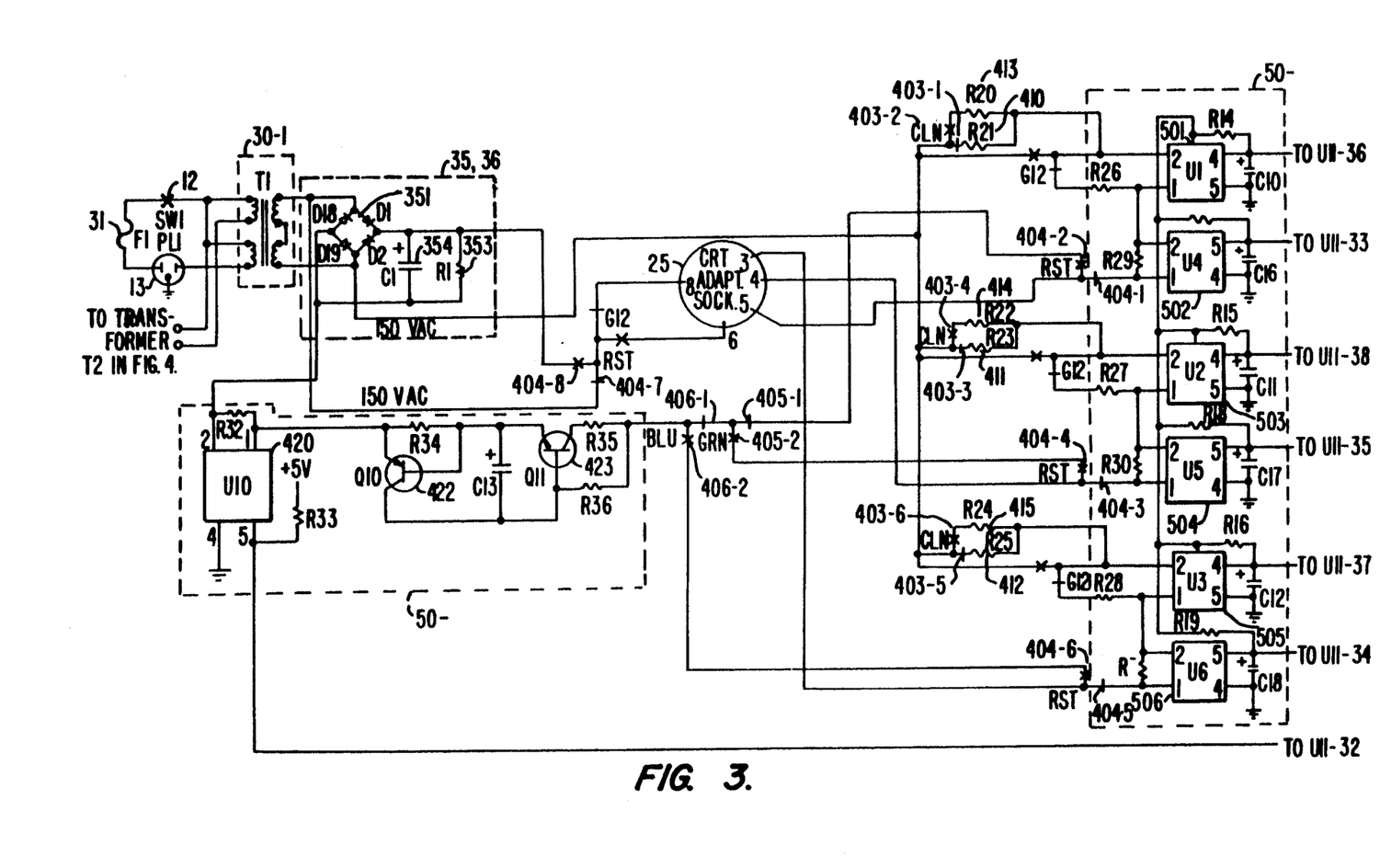
FIGS. 3-5 are schematic diagrams of the preferred embodiment of the invention.
Figure 4:
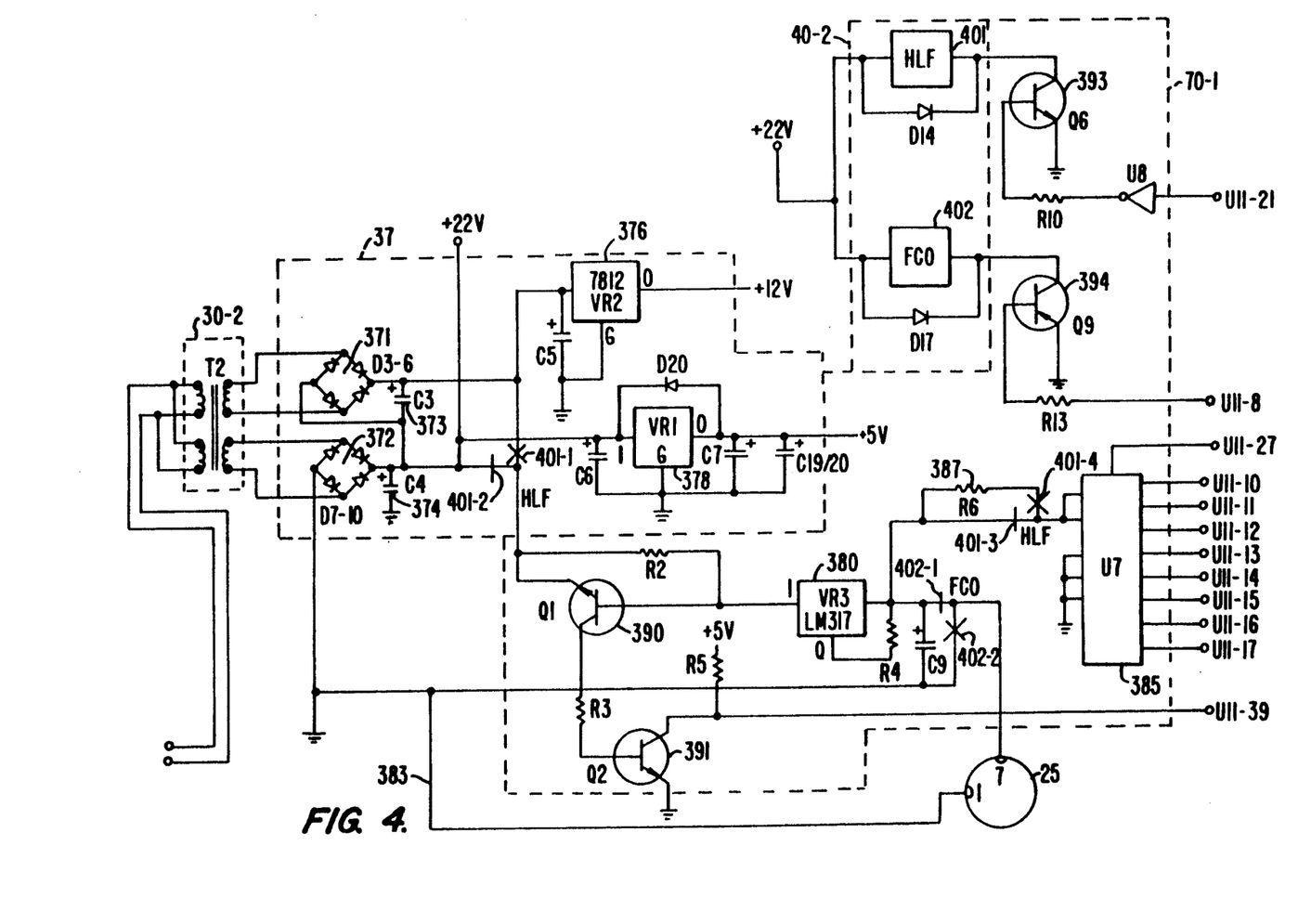

Panel 10 and the elements contained therein are designed to be installed in a portable housing (not shown) containing the various system components illustrated in block diagram form in FIG. 2. With reference to FIG. 2, a transformer unit 30 is coupled by means of power switch 12 and fuse 31 to a standard AC voltage source 33. Transformer unit 30, which is shown in detail in FIGS. 3 and 4, is coupled to three different power supply units: an AC power unit 35, a relatively high voltage DC power unit 36 and a low voltage DC power unit 37. AC power unit 35 provides approximately 150 volts AC; relatively high voltage DC power unit 36 provides approximately 210 volts DC and relatively low voltage DC power unit 37 provides either approximately 15 or 30 volts DC, depending upon the selected value of the filament voltage, which operation is described below. The voltage outputs from power units 35-37 are transferred via a set of power relays 40 shown in FIGS. 3-5 to connector cable 23 on a selective basis in the manner described below. From connector cable 23 the electrical connections are transferred to the filament 41, cathode 42 and grid 43 of a CRT 44 partially depicted in FIG. 2. For simplicity, a monochrome CRT is illustrated. It is understood that connector cable also contains the electrical conductors required to supply the requisite voltages to the element, cathode and grid elements of a color CRT. Transfer of electrical voltages and currents is done by means of adapter 25 which has a mechanical pin configuration fully conformable with the base 45 of CRT 44. A voltage and current sensor unit 50 monitors the voltage and current flowing in the filament 41 and the circuit including cathode 42 and grid 43.

Figure 5:
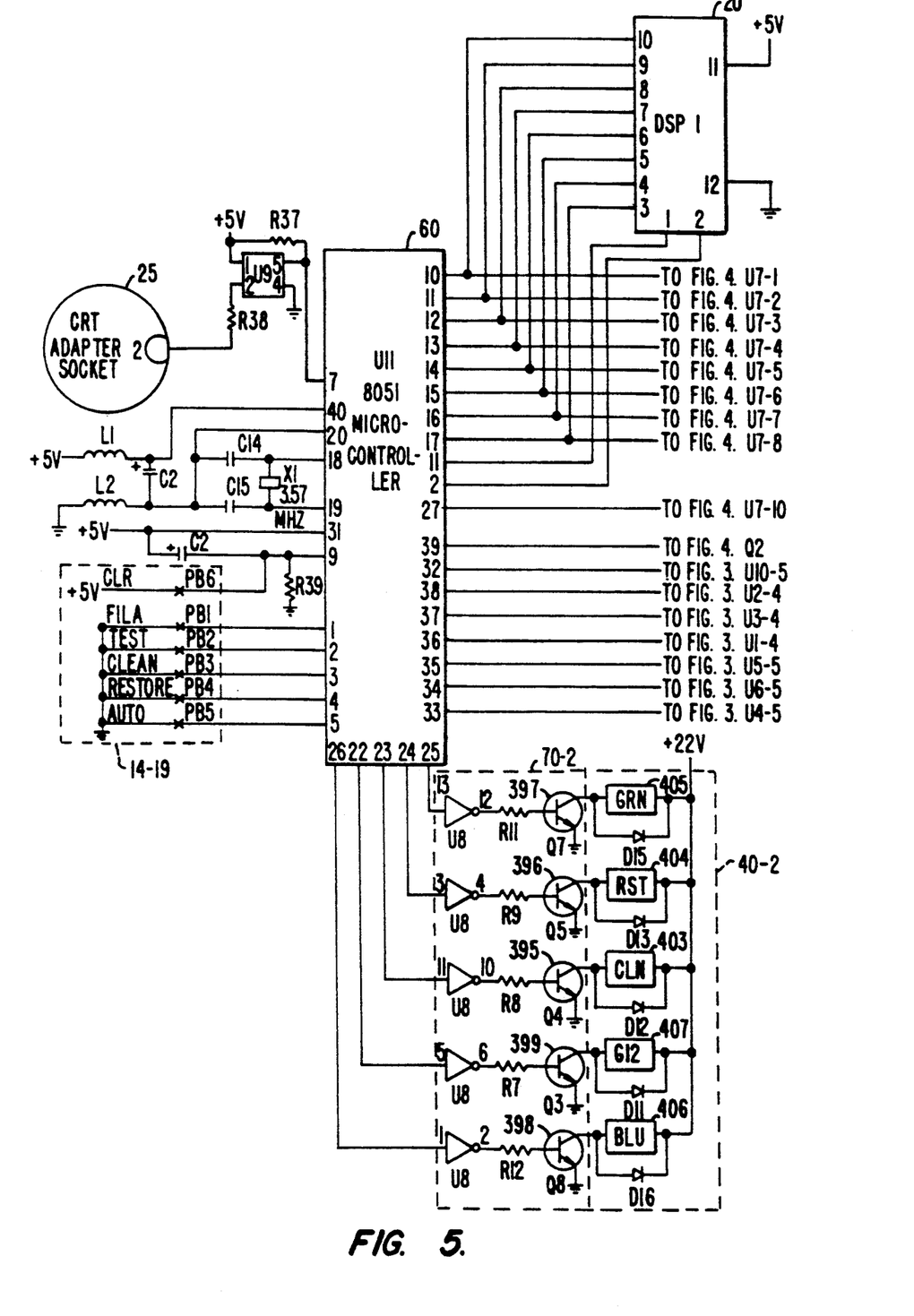

The voltage values and current values sensed by voltage and current sensor unit 50 are fed back to a microprocessor 60 which controls the system, including display 20 and power relays 40. The power relays are directly driven by means of a relay control unit 70 coupled to microprocessor 60. The elements comprising both the voltage and current sensor unit 50 and the relay control unit 70 are illustrated in FIGS. 3-5. Microprocessor 60 also monitors the state of individual push button switches 14-19 and responds to the actuation of these switches in the manner described below.

With reference to FIGS. 3 and 4, transformer unit 30 includes a pair of transformers 30-1, 30-2 connected as shown in these Figs. The output of transformer 30-1 is coupled to a full wave bridge circuit 351. The top and bottom terminals of bridge circuit 351 provide the AC power to power relays 40, while the side terminals provide the relatively high voltage DC power. Transformer 30-1 provides approximately 150 volts AC to bridge circuit 351. The bridge circuit 351 provides approximately 210 volts DC. Resistor 353 bleeds accumulated DC voltage from capacitor 354 when power is removed. Both the 150 volts AC and the 210 volts DC are directed to the cathodes of the CRT through various relay contacts and CRT adapter 25 in the manner more fully described below.

AC voltage supplied by the two secondaries of transformer 30-2 is coupled to the top and bottom of a pair of associated full wave bridge circuits 371, 372. The output of bridge 371 is filtered by capacitor 373, while the output of bridge 372 is filtered by capacitor 374. The output from each bridge circuit 371, 372 is approximately 15 volts DC. Capacitor 373 is coupled to the input of a voltage regulator, preferably a Motorola type 7812CT unit which supplies a regulated 12 volts DC. Capacitor 374 is coupled to the input of a second voltage regulator 378, preferably a National type LM2940T-5, and provides a regulated five volts DC. These voltages are used as supply voltages for both the relays and appropriate portions of the logic circuitry. Unit 37 supplies a filament supply voltage of either approximately 15 or 30 volts depending on the state of one of the power relays 40, viz., power relay 401. When relay 401 is in the unactuated state, contact 401-1 is open and contact 401-2 is closed so that only the lower bridge 372 supplies the basic filament operating voltage to the input of a voltage controlled variable voltage regulator 380. Filament return to ground is via conductor 383. The actual value of the voltage output from voltage regulator 380 is determined by the value of an eight bit digital character supplied from microprocessor 60 to a digital-to-analog converter 385. The analog control output signal from converter 385, which is preferably an Analog Devices type AD558 integrated circuit, is normally coupled via normally closed contact 401-3 of relay 401 to the connection point shown. When it is desired to increase the value of the raw filament supply voltage from power unit 37, relay 401 is activated by a control signal from microprocessor 60 which causes the output of upper full wave bridge circuit 371 to be coupled to the input of voltage regulator 380 and also causes the control analog output signal from digital-to-analog converter 385 to be coupled through a resistor 387 to the output of regulator 380. Actuation of relay 401 effectively doubles the value of the raw filament supply voltage.

Relay 402, when actuated, is used to disconnect the filament supply voltage from the adaptor 25 and to ground the two filament conductors.

Transistors 390, 391 form a current flow sensor for the filament voltage and can detect the absence of a filament connected to adapter 25 (or a broken filament in a CRT physically connected to adapter 25). The output of transistor 391 is pulled low whenever current flows through transistor 390. The collector output from transistor 391 is coupled to one of the microprocessor input ports as a feedback signal specifying the state of the current flow.

Transistors 393, 394 are standard switching transistors biased to saturation mode operation and are operated in response to actuation signals from microprocessor 60. Transistor 393 controls the state of relay 401, which determines the range of raw filament voltages; while transistor 394 controls the state of relay 402, which determines whether the filament voltage is connector to or disconnected from adapter 25.

With reference to FIG. 5, the remaining power relays are the clean relay 403, restore relay 404, green relay 405, blue relay 406, and G12 relay 407. The corresponding control transistors are transistors 395–399, respectively. Each relay is operated in response to the generation of a relay operation control signal by microprocessor 60 which is used to switch the corresponding switching transistor 395–399. The contacts associated with these relays are all shown in FIG. 3 and are identified with prefix numbers corresponding to the relay number followed by an individual contact number. For example, the contacts for clean relay 403 are numbered 403-1 through 403-6. The normally closed contact is denoted by a solid single line, while the normally open relay is indicated by a decussate symbol.

It should be noted that the G12 relay 407 is not operational in the system described in the preferred embodiment. Accordingly, to avoid unnecessary complication of the drawings, the relay contacts for relay 407 have not been numbered.

With respect to the relay operation, in general the restore relay 404 determines whether AC or DC current is allowed to flow between the cathode and grid elements of the connected CRT; while the clean relay 403 sets the level of current by inserting a resistor of appropriate value into the cathode/grid element circuit. In particular, three resistor pairs are associated with the clean relay; resistors 410–412 and resistors 413–415. Resistors 410–412 are inserted in the cathode/grid circuit of each gun element whenever a clean operation is not in process: viz., during test and restore. Resistors 413–415 are inserted whenever the cleans operation is in process. Resistors 410–412 are preferably Ohmite 47K half watt five percent resistors; while resistors 413–415 are preferably Ohmite type IK five watt 95J1KO resistors.

During the test mode of operation, prior to the application of filament voltage to the adapter 25, 150 volts AC is supplied to the adapter 25 to check for any cathode/grid shorts. If a short exists, the associated optoisolator sensor provides a feedback signal to microprocessor 60.

During the clean procedure, the clean relay 403 inserts resistors 413–415 into the cathode/grid circuit in each gun element, which permits the flow of AC current between the cathode/grid circuit of each gun element. Thus, in both the test and clean procedures, only AC voltage is applied across the cathode/grid circuit of each gun: the relatively high DC voltage supplied by bridge circuit 351 is blocked by the open state of restore relay contact 404-8.

During the restore procedure, the relatively high DC voltage supplied by bridge 351 is applied sequentially across each selected cathode/grid element, while AC voltage is blocked by the open state of restore relay contact 404-7. Restore relay contacts 404-2, 404-4 and 404-6 permit the relatively high DC voltage to flow to the grid connections in adapter 25 for the red, green and blue grids in the CRT, depending on the state of the green relay 405 and the blue relay 406. During the restore procedure, only one cathode/grid element circuit at a time is subjected to the current flow from the relatively high DC voltage source (bridge 351). Which particular cathode/grid circuit is involved depends upon the state of the green and blue relays 405, 406. If neither of these relays is activated, DC current flows through the red cathode/grid element by default. If the green relay 405 is activated, DC current flows only through the green cathode/grid element and, correspondingly, if the blue relay is activated, DC current flows only through the blue cathode/grid circuit. If both the green and the blue relays are activated simultaneously, only the blue cathode/grid circuit will be involved in the restore procedure, since blue relay contact 406-1 will be open.

Throughout the restore procedure, the DC current flowing through the selected cathode/grid circuit is monitored and regulated. Current monitoring is provided by an optoisolator sensing device 420, preferably a Motorola type 4N25 optoisolator, which provides a feedback signal to one of the input ports of microprocessor 60. Current limiting for the DC current flowing through the selected cathode/grid circuit is provided by transistors 422, 423 in combination with the discrete circuit elements shown in FIG. 3, which function to limit the DC current to a maximum value of about 85 milliamps.

During the test, clean and restore procedures, the cathode DC current for each gun element is monitored by means of three pairs of maximum/minimum current sensors, one pair provided for each gun element. These sensors are shown in FIG. 3 and comprise the integrated circuits 501–506 and the associated biasing resistive elements. Integrated circuits 501, 503 and 505 preferably comprise type H11 L1 circuits; while integrated circuits 502, 504 and 506 preferably comprise type 4N25 optoisolators.

With reference to FIG. 5, microprocessor 60 is preferably a type 8051 microcontroller provided with a crystal oscillator source and driven by the five volt supply described above. Microprocessor 60 includes approximately 4,096 bytes of programmable ROM and 128 bytes of RAM memory, and has four programmable eight bit ports for control application. Display unit 20 is preferably a monolithic 16 digit alpha-numeric display available as a simple programmable and I/O unit for display functions. Display unit 20 is capable of displaying all 96 standard ascii characters and interfaces to the microprocessor 60 through one eight bit port and two control lines. Push button switches 14–19 form a keypad connected to an input port on the microprocessor 60. Also switch sensing and debouncing is done in software by microprocessor 60. The program installed in microprocessor 60 is listed at the end of this specification.

Operation of the invention proceeds as follows. The operator first notices the CRT type and consults a system setup chart to determine the proper adapter to use with the connector 25 and installs the adapter onto the CRT. Thereafter, AC power is applied to the socket 13 by means of a power cord. Next, the filament push button 14 is depressed and the display is observed. By repeatedly depressing the filament push button 14, microprocessor 60 will cycle the display 20 through the range of selectable filament voltages and CRT types (i.e., 6.3 volt monochrome, 6.3 volt color, 12.6 monochrome, etc.) until the operator notes the display of the correct match. Thereafter, the operator selects one of the function push buttons 15-19 to begin a particular desired function. For example, by depressing the TEST push button 15, microprocessor 60 causes the system to enter the Test procedure, operation of the CLN push button 16 will commence operation of the clean procedure, operation of the RES push button 17 will commence operation of the restore procedure, operation of the AUTO push button 18 will commence operation of the fully automated test, clean and restore procedure, and operation of the CLR push button 19 will reset the microprocessor 60 to the initial state. Since the test, clean and restore procedures are subsets of the complete auto procedure, that procedure will now be described.

After operation of the AUTO push button 18, the microprocessor 60 commences the test procedure by displaying serially on the display 20 the following:

FILAMENT

ACTIVITY

TEST

In accordance with the Beltron process, during the test procedure, the filament is subjected to a gradually increasing filament voltage beyond the normal value to a value of approximately 60% greater than normal. This is designated by the display:

HEATING 40

During heating of the filament, the microprocessor counts down from a maximum of 40 seconds so that the number to the right of the word HEATING decrements by one each second. During this filament heating time, the microprocessor monitors the amount of current flowing through the CRT filament by means of sensors 501-506. At the end of the filament heating portion of the test procedure, the microprocessor displays the measured result of the emission time required for each cathode/grid circuit to reach the threshold DC current (85 milliamps in the preferred embodiment) in the following fashion:

R027 G021 B021

The displayed result assumes a measured emission rise time for the red gun of 27 seconds, for the green gun of 21 seconds and for the blue gun of 21 seconds. The microprocessor 60 next displays:

TESTING

FIL ACTIVITY

During this period, the microprocessor reduces the filament voltage to the nominal value and measures the emission time for each cathode/grid circuit from the information supplied by sensors 501-506. When the last gun element has started to decay below the threshold value (0.8 milliamps in the preferred embodiment), the microprocessor displays the result thus:

R003 G004 B004

This signifies that the emission time of the red cathode/grid circuit is measured to be three seconds, that of the green circuit is four seconds and that of the blue circuit is four seconds.

After the test procedure has been completed, the microprocessor 60 automatically enters the clean procedure by first heating the cathode by elevating the filament voltage in a gradual manner to approximately 60% above normal value. During this process, the microprocessor causes the display 20 to read:

HEATING 49

During the heating portion of the clean procedure, the cathode is subjected to a heating cycle of 50 seconds duration. After 50 seconds have elapsed, the cleaning procedure continues with the application of AC voltage across the cathode/grid elements of each gun circuit in the CRT involved with the procedure. During this time the microprocessor causes the display 20 to read:

CLEANING

CLEANED

Once the clean procedure has been completed, the microprocessor will enter the restore procedure for any gun element requiring this procedure. During the restore procedure, the relatively high DC voltage is applied to the first one of the cathode/grids circuit to be subjected to the restore procedure, then to the second cathode/grid circuit and, when necessary, to the last cathode/grid circuit. At the beginning of the restore procedure, the microprocessor applies a gradually increasing filament voltage to the CRT filament and during this time causes the display 20 to read:

HEATING

After the requisite initial heating period, the microprocessor causes the relatively high DC voltage to be applied across the first cathode/grid circuit, causes display 20 to read:

RESTORING RED

While the red gun element is being restored, the microprocessor monitors the current flow by monitoring the signal supplied by sensor elements 501-506, as well as sensor element 420. Whenever the microprocessor senses that the current flow has reached the proper level and is steady state, the restore procedure is terminated for that gun element. The restore procedure is then repeated for the next gun element by initiating a heating cycle and causing display 20 to read:

HEATING

RESTORING GREEN

HEATING

RESTORING BLUE

After the completion of the restore procedure, the tube is allowed to cool down by removing the filament voltage supplied to the CRT. During this time the microprocessor causes the display 20 to display:

COOLING 30.

Thereafter, the microprocessor 60 initiates another clean procedure, causing the display 20 to read:

CLEANING

CLEANED

Next, microprocessor 60 repeats the filament activity test while causing display 20 to read:

FILAMENT

ACTIVITY

TEST

HEATING 40

EMISSION RISE

R006 G007 B007

The emission rise figures evidence a substantially reduced rise time resulting from the restore procedure. Next, the microprocessor 60 causes the emission time to be tested, causing display 20 to read:

TESTING

FIL ACTIVITY

R013 G010 B12

The emission numbers displayed for the red, green and gun elements illustrate the improved emission time resulting from the restore procedure. It should be noted that the above numbers are by way of example only, and that the actual numbers will vary from CRT to CRT.

As noted above, the test, clean and restore procedures are subsets of the auto function. Consequently, they will not be described in detail. It is understood that these procedures follow the Beltron process as described above.

During any portion of any of the test, clean and restore procedures or during the performance of the auto function, the operator may terminate the operation by simply actuating the clear push button 19.

As will now be apparent, the invention provides a substantial improvement over the previous Beltron system used to implement the Beltron process by eliminating the need for subjective evaluation of the gun currents, filament voltage and restore current lamps formerly employed in the field. In addition, by eliminating the need to change the connector among three different sockets in order to perform the three different basic procedures (i.e., test, clean and restore), the CRT testing and reconditioning process is substantially shortened in time and streamlined. In addition, the isolation transformers employed in transformer unit 30 provide additional safety protection from electrical shock. Further, the current limiting afforded by portion 50-1 of the voltage and current sensor unit 50 provides additional safety protection for both the operator and the CRT under restoration.

While the above provides a full and complete disclosure of the preferred embodiments of the invention, various modifications, alternate constructions and equivalents may occur to those skilled in the art. For example, while particular types of electronic circuit components have been identified, other equivalent circuit elements may be employed, as desired. Therefore, the above should not be construed as limiting the scope of the invention, which is defined by the appended claims.

What is claimed is:

1. A microprocessor controlled system for testing and selectively reconditioning a cathode ray tube (CRT) having a filament and at least one pair of cathode/grid elements, said system comprising:

power supply means for generating an AC voltage, a relatively high DC voltage, and a relatively low DC voltage;

connector means adapted to be coupled to the filament, cathode and grid elements of a CRT;

means for selectively converting the relatively low DC voltage to a filament DC voltage;

power transfer mans for selectively applying the AC voltage, the relatively high DC voltage and the filament DC voltage to said connector means;

operator selectable information entry means for selecting a filament voltage matched to a CRT to be tested and for specifying a function to performed on the CRT;

display means for displaying information related to the filament voltage and a function specified by said entry means;

sensor means coupled to said connector means for monitoring any current flowing through the cathode/grid elements of the CRT; and processor means coupled to said operator entry means, said converting means, said sensor means, said power transfer means and said display means for selectively controlling the value of the filament voltage, the application of the AC voltage and the relatively high DC voltage to the connector means, and a function to be performed in accordance with a process including a test function, a clean function and a restore function.

2. The invention of claim 1 wherein said converting means comprises a voltage controlled variable voltage regulator having a control input, and a digital-to-analog converter having an output coupled to said control input and an input coupled to said processor means for receiving a digital word specifying the required filament voltage value.

3. The invention of claim 1 wherein said converting means includes means for selecting one of two ranges of permitted filament voltage values.

4. The invention of claim 1 wherein said power transfer means comprises a plurality of controllable relays having power input terminals coupled to said power supply means, power output terminals coupled to said connector means, and control input terminals coupled to said processor means.

5. The invention of claim 1 wherein said information entry means includes a plurality of push button switches each specifying a different function to be performed.

6. The invention of claim 1 wherein said sensor means includes at least one pair of DC current sensing circuits for indicating the minimum value and the maximum value of current flowing through the cathode/grid elements of the CRT.

7. The invention of claim 1 wherein said sensor means includes means for determining the absence of a conductive CRT filament.

8. The invention of claim 1 further including current limiting means coupled to said power transfer means for limiting the value of the DC current flowing through the cathode/grid elements of the CRT.

9. The invention of claim 1 wherein the CRT has three pairs of cathode/grid elements; and wherein said power transfer means includes for simultaneously applying AC voltage to said three pairs of cathode/grid elements during said clean function.

10. The invention of claim 1 wherein the CRT has three pairs of cathode/grid elements; and wherein said power transfer means includes means for consecutively applying the relatively high DC voltage to said three pairs of cathode/grid elements during said restore function.

11. The invention of claim 1 wherein said converting means includes means for selecting one of two ranges of permitted filament voltage values.

* * * * *